(12) United States Patent
Lee et al.

(10) Patent No.: US 8,762,896 B2
(45) Date of Patent: Jun. 24, 2014

(54) MOBILE TERMINAL AND METHOD OF DISPLAYING INFORMATION IN MOBILE TERMINAL

(75) Inventors: Yongdeok Lee, Seoul (KR); Jungwoo Kim, Seoul (KR); Kwonhan Bae, Seoul (KR); Hyesang Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 785 days.

(21) Appl. No.: 12/540,958

(22) Filed: Aug. 13, 2009

(65) Prior Publication Data

US 2010/0304791 A1 Dec. 2, 2010

(30) Foreign Application Priority Data

Jun. 2, 2009 (KR) ........................ 10-2009-0048474

(51) Int. Cl.
*G06F 3/0482* (2013.01)

(52) U.S. Cl.
USPC ........... 715/864; 715/784; 715/786; 715/787; 345/1.1

(58) Field of Classification Search
CPC . G06F 3/0482; G06F 1/1626; H04M 1/72583
USPC ........................................................ 715/864
See application file for complete search history.

(56) References Cited

U.S. PATENT DOCUMENTS

| | | | | |
|---|---|---|---|---|
| 6,331,840 B1* | 12/2001 | Nielson et al. | .................. | 345/1.1 |
| 6,910,191 B2* | 6/2005 | Segerberg et al. | ............. | 715/830 |
| 6,983,424 B1* | 1/2006 | Dutta | ............................. | 715/800 |
| 7,158,878 B2* | 1/2007 | Rasmussen et al. | .......... | 701/431 |
| 7,328,411 B2* | 2/2008 | Satanek | ........................ | 715/786 |
| 7,379,811 B2* | 5/2008 | Rasmussen et al. | .......... | 701/532 |
| 7,707,516 B2* | 4/2010 | O'Mullan et al. | ............. | 715/834 |
| 7,859,518 B1* | 12/2010 | Northway et al. | ............. | 345/169 |
| 7,865,301 B2* | 1/2011 | Rasmussen et al. | .......... | 701/457 |
| 7,992,103 B2* | 8/2011 | Gusmorino et al. | .......... | 715/835 |
| 8,487,957 B1* | 7/2013 | Bailly et al. | .................. | 345/619 |
| 8,510,268 B1* | 8/2013 | LaForge et al. | ............... | 707/625 |
| 8,515,207 B2* | 8/2013 | Chau | ............................. | 382/294 |
| 2003/0090524 A1* | 5/2003 | Segerberg et al. | ............ | 345/786 |

(Continued)

FOREIGN PATENT DOCUMENTS

WO WO 2005/041589 A1 5/2005

OTHER PUBLICATIONS

Working screenshot of Windows Vista manufactured by Microsoft, released on Jan. 30, 2007, 9 pages.*

(Continued)

*Primary Examiner* — William Bashore
*Assistant Examiner* — Reza Nabi
(74) *Attorney, Agent, or Firm* — Ked & Associates, LLP

(57) ABSTRACT

A mobile terminal comprises a first touch screen and a controller. The controller provides the first touch screen with an information region that includes at least one information item and first and second control regions for controlling a display of the information region. The controller also controls a viewing perspective of the information region in response to a first touch input for the first control region, and controls at least one of the number or type of the at least one information item in response to a second touch input for the second control region. The controller may also control the information region to have a two-dimensional or three-dimensional viewing perspective in response to the first touch input.

19 Claims, 19 Drawing Sheets

(56) References Cited

U.S. PATENT DOCUMENTS

| | | | |
|---|---|---|---|
| 2004/0049743 A1* | 3/2004 | Bogward | 715/531 |
| 2004/0100479 A1 | 5/2004 | Nakano et al. | 345/700 |
| 2006/0020899 A1* | 1/2006 | Gusmorino et al. | 715/765 |
| 2007/0018968 A1 | 1/2007 | Iwamoto et al. | 345/173 |
| 2007/0055940 A1* | 3/2007 | Moore et al. | 715/738 |
| 2007/0143705 A1* | 6/2007 | Peters | 715/786 |
| 2009/0281596 A1* | 11/2009 | King et al. | 607/46 |
| 2010/0007613 A1* | 1/2010 | Costa | 345/173 |
| 2010/0260402 A1* | 10/2010 | Axelsson et al. | 382/131 |
| 2010/0302179 A1* | 12/2010 | Ahn et al. | 345/173 |
| 2010/0333006 A1* | 12/2010 | Ostergard et al. | 715/768 |
| 2011/0047459 A1* | 2/2011 | Van Der Westhuizen | 715/702 |
| 2011/0148739 A1* | 6/2011 | Nurmi | 345/1.3 |
| 2011/0242361 A1* | 10/2011 | Kuwahara et al. | 348/231.4 |
| 2011/0244924 A1* | 10/2011 | Jung et al. | 455/566 |
| 2012/0089947 A1* | 4/2012 | Lee et al. | 715/839 |

OTHER PUBLICATIONS

European Search Report dated Jan. 28, 2014 issued in Application No. 09 01 0056.

* cited by examiner

FIG. 12
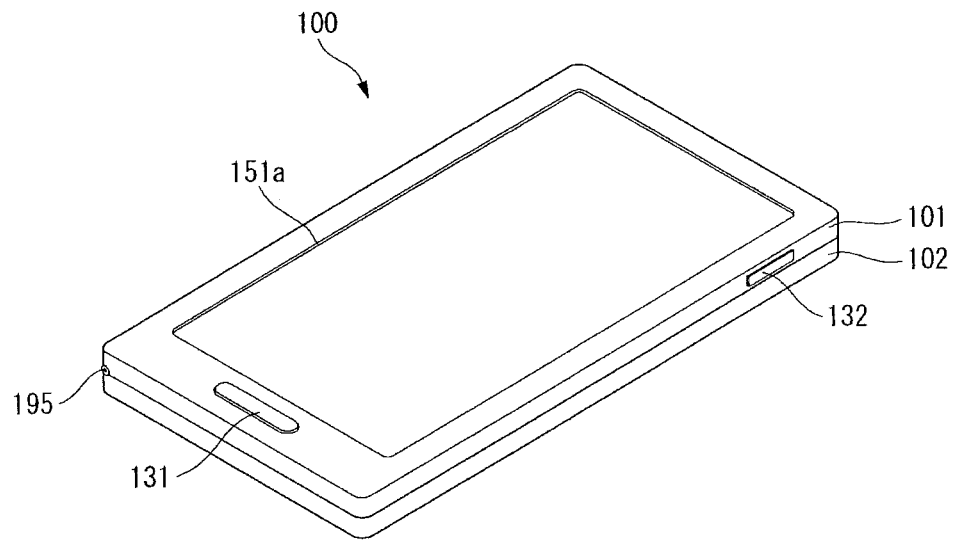
(A)
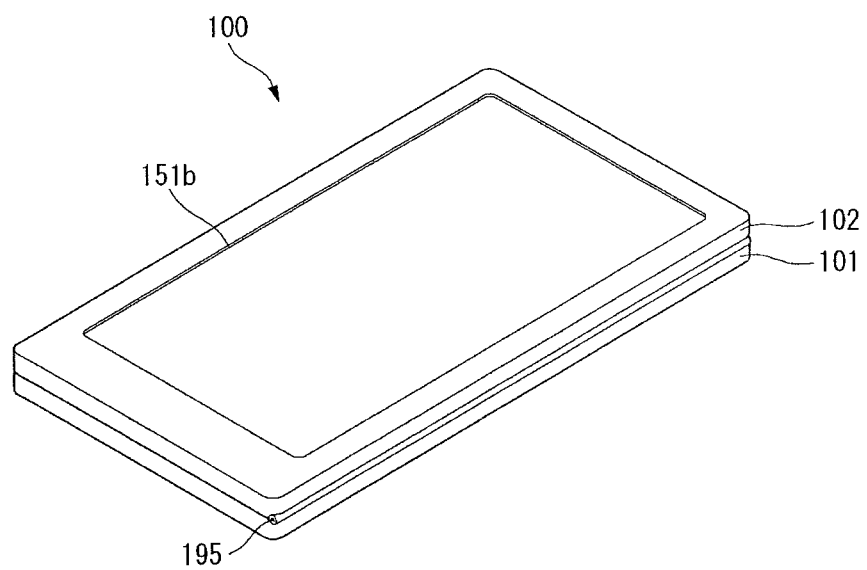
(B)

FIG. 13
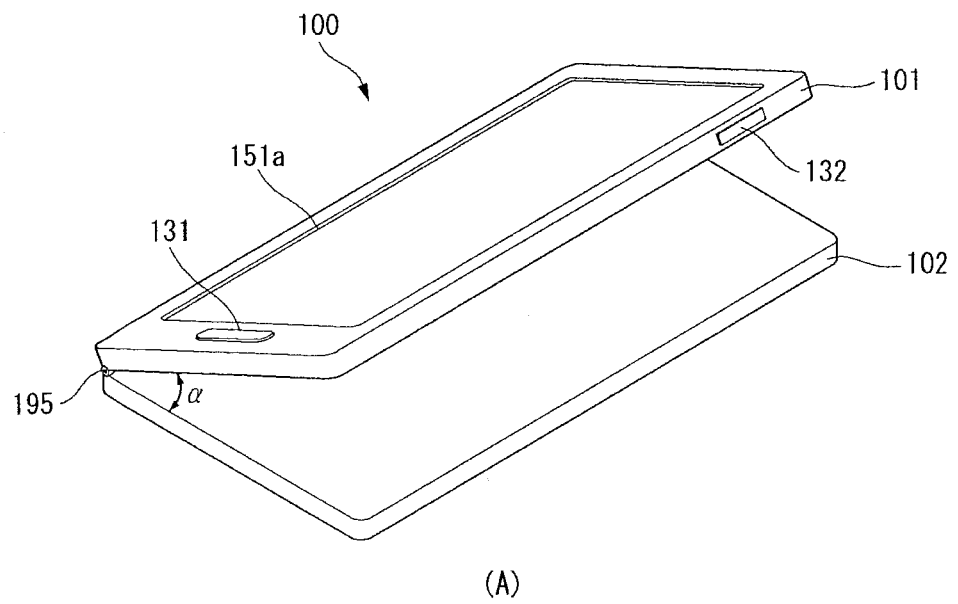
(A)
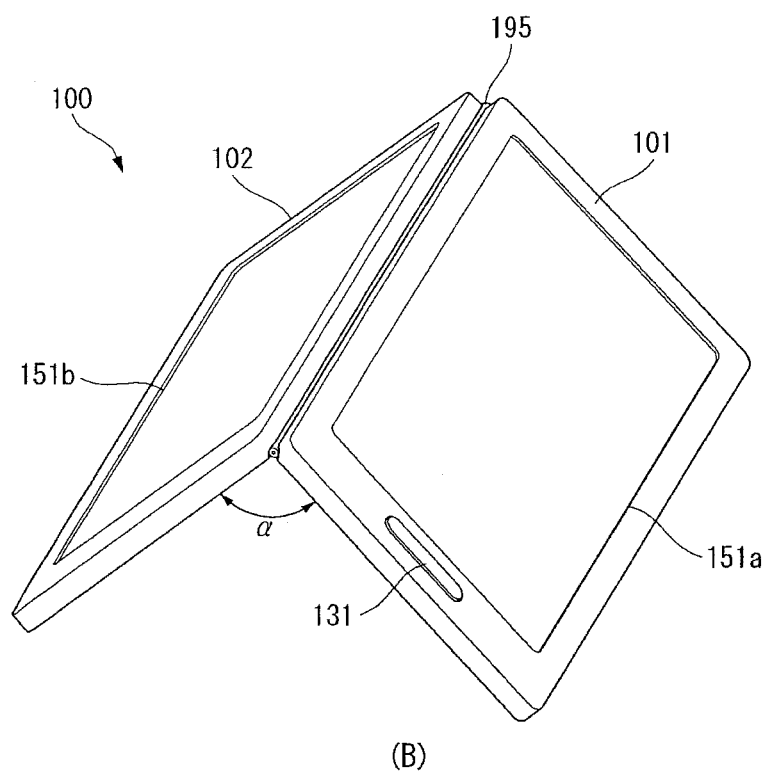
(B)

(A) → (B)

(A)  (B)

MOBILE TERMINAL AND METHOD OF DISPLAYING INFORMATION IN MOBILE TERMINAL

CROSS-REFERENCE TO RELATED APPLICATIONS

This application claims priority to Korean Application No. 10-2009-0048474, filed in Korea on Jun. 2, 2009, the contents of which are incorporated herein by reference.

BACKGROUND

1. Field

One or more embodiments described herein relate to controlling the operation and display of information on mobile terminals or other electronic devices.

2. Background

Some mobile terminals provide multimedia content such as text, still pictures, motion pictures, and/or broadcasting information. However, this content is provided in simple thumbnail or list modes through an interface such as a graphical user interface. Use of these modes has proven to be inefficient, especially when various multimedia content is managed or when a user searches for or selects a specific multimedia content.

BRIEF DESCRIPTION OF THE DRAWINGS

The embodiments will be described in detail with reference to the following drawings in which like reference numerals refer to like elements, wherein:

FIGS. 12 to 14B are diagrams showing examples of an external appearance of the mobile terminal;

DETAILED DESCRIPTION

Various embodiments described herein control the operation and display of information in electronic devices that have or are coupled to a display. These devices include but are not limited to mobile phones, smart phones, personal digital assistants (PDAs), integrated devices that include music players, portable multimedia players (PMPs), navigation devices, personal, desktop, or notebook computers, and terminals for digital broadcast.

In accordance with one embodiment, a mobile terminal and method for displaying information in the mobile terminal controls a viewing perspective of an information region in a display unit and/or a type or number, or both, of information items displayed in the information region.

In accordance with another embodiment, a mobile terminal and method for displaying information in the mobile terminal controls a type or number, or both, of information items displayed in an information region, along with a viewing perspective of the information region.

In accordance with another embodiment, a mobile terminal and method for displaying information in the mobile terminal provides, on a touch screen, a first control region for controlling a viewing perspective of an information region and a second control region for controlling a type or number, or both, of the information items.

In accordance with another embodiment, a mobile terminal includes a first touch screen and a controller. The controller is configured to provide the first touch screen with an information region, including at least one information item, and first and second control regions for controlling a display of the information region, control a viewing perspective of the information region in response to a first touch input for the first control region, and control at least one of the number and type of the at least one information item in response to a second touch input for the second control region. Further, the controller controls the information region so that the information region has any one of a 2D viewing perspective and a 3D viewing perspective in response to the first touch input.

In accordance with another embodiment, a method for displaying information in a mobile terminal, comprises providing a first touch screen, included in the mobile terminal, with an information region including at least one information item and first and second control regions for controlling a display of the information region, controlling a viewing perspective of the information region in response to a first touch input for the first control region, and controlling at least one of the number and type of the at least one information item in response to a second touch input for the second control region. The control on the viewing perspective of the information region includes controlling the information region so that the information region has either a 2D viewing perspective or a 3D viewing perspective in response to the first touch input.

Figure 1:
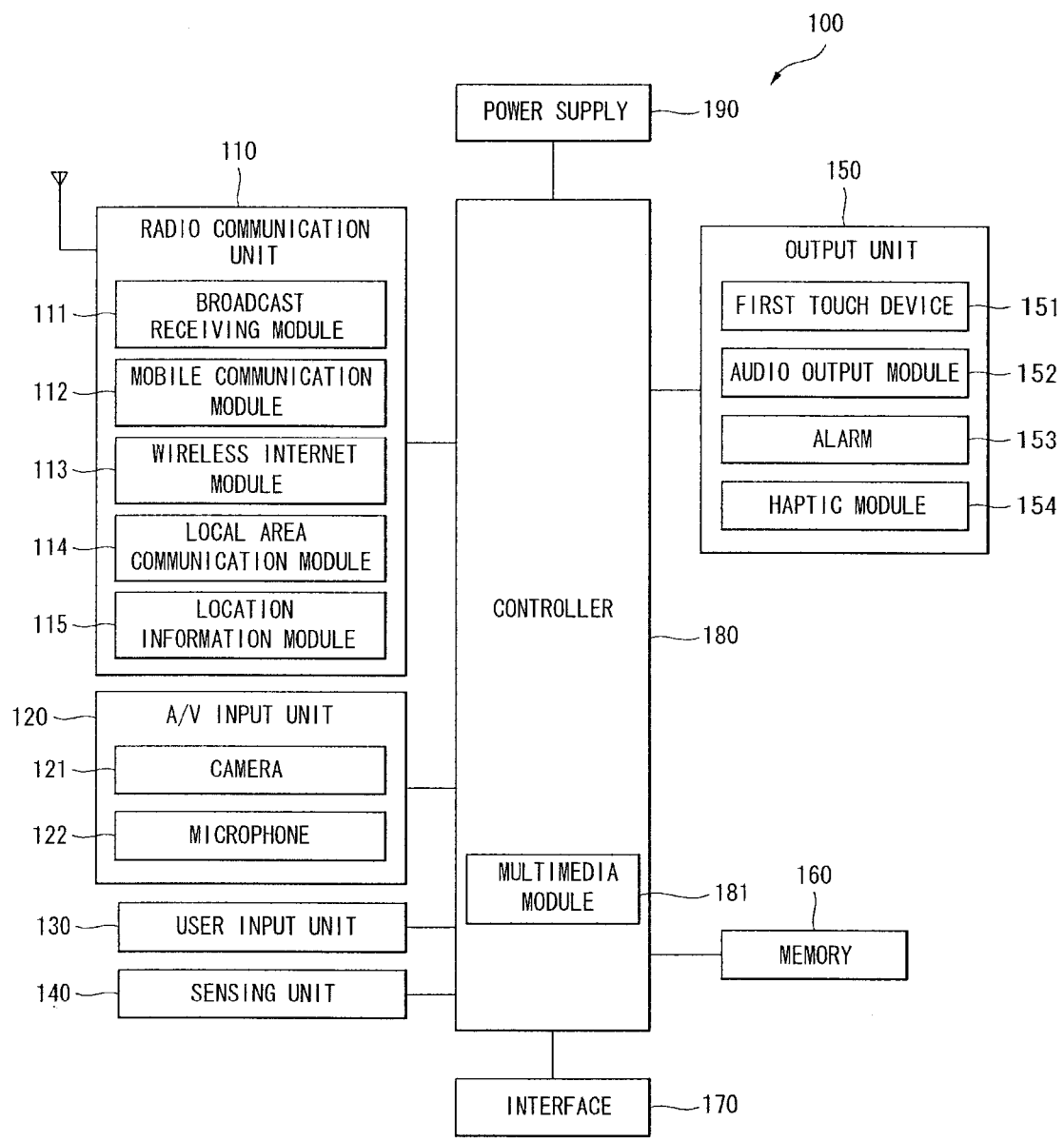
FIG. 1 is a diagram shoving one embodiment of a mobile terminal.

FIG. 1 shows one embodiment of a mobile terminal 100 that includes a radio communication unit 110, an audio/video (A/V) input unit 120, a user input unit 130, a sensing unit 140, an output unit 150, a memory 160, an interface 170, a controller 180, and a power supply 190. The terminal may omit or include other features in other embodiments.

The radio communication unit 110 includes at least one module that enables radio communication to take place between the terminal and a radio communication system, or between the terminal and a network in which the terminal is located, operating, or connected. For example, the radio communication unit may include a broadcasting receiving module 111, a mobile communication module 112, a wireless Internet module 113, a local area communication module 114, and a position information module 115.

The broadcasting receiving module 111 receives broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information, or a server that receives previously created broadcasting signals and/or broadcasting related information and transmits the broadcasting signals and/or broadcasting related information to a terminal. Further, the broadcasting signals may include not only TV, radio, and/or data broadcasting signals, but also signals in the form of a combination of TV broadcasting signals and radio broadcasting signals.

The broadcasting related information may include information on a broadcasting channel, a broadcasting program, or a broadcasting service provider, and may be provided even through a mobile communication network. In the latter case, the broadcasting related information may be received by mobile communication module 112.

The broadcasting related information may exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

The broadcasting receiving module 111 receives broadcasting signals using various broadcasting systems. Particularly, the broadcasting receiving module can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module can also be constructed to be suited to broadcasting systems providing broadcasting signals other than the above-described digital broadcasting systems.

The broadcasting signals and/or broadcasting related information received through the broadcasting receiving module can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

The wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 corresponds to a module for local area communication. Further, Bluetooth, radio frequency identification (RFID), infrared data association (IrDA), ultra wideband (UWB) and ZigBee can be used as a local area communication technique.

The position information module 115 confirms or obtains the position of the mobile terminal. The position information module can obtain position information using a global navigation satellite system (GNSS). The GNSS is a term used to describe radio navigation satellite systems configured to transmit respective reference signals capable of determining their positions on the surface of the earth or near the surface of the earth while revolving the earth. The GNSS includes a global position system (GPS) operated by the United States of America, Galileo operated by the EC, a global orbiting navigational satellite system (GLONASS) operated by Russia, COMPASS operated by China, a quasi-zenith satellite system (QZSS) operated by Japan, and so on.

The position information module may include a GPS module 115 as a representative example of the GNSS. The GPS module can calculate information on distances between one point (or object) and at least three satellites and information on the time when the distance information is measured and apply trigonometry to the obtained distance information to obtain three-dimensional position information on the point (or object) according to the latitude, longitude and altitude at a predetermined time. Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera processes image frames of still images or moving images obtained by an image sensor in a video telephony mode or a photographing mode. Further, the processed image frames can be displayed on a display unit 151.

The image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as an open/close state of the mobile terminal, the position of the mobile terminal, whether a user touches the mobile terminal, the direction of the mobile terminal and the acceleration/deceleration of the mobile terminal, and generates a sensing signal for controlling the operation of the mobile terminal. For example, the sensing unit 140 can sense whether a slide phone is opened or closed when the mobile terminal is the slide phone. Furthermore, the sensing unit 140 can sense whether the power supply 190 supplies power and whether the interface 170 is connected to an external device. The sensing unit can also include a proximity sensor 141.

The output unit 150 generates visual, auditory or tactile output and can include the display unit 151, an audio output module 152, an alarm 153 and a haptic module 154.

The display unit 151 displays information processed by the mobile terminal 100. For example, the display unit displays a user interface (UI) or graphic user interface (GUI) related to a telephone call when the mobile terminal is in the call mode. The display unit also displays a captured or/and received image, UI or GUI when the mobile terminal 100 is in the video telephony mode or the photographing mode.

The display unit can include at least one of a liquid crystal display, a thin film transistor liquid crystal display, an organic light-emitting diode display, a flexible display and a three-dimensional display. Further, some of these displays can be of a transparent type or a light transmission type. That is, the display unit can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal, which is occupied by the display unit 151.

The mobile terminal can include at least two display units. For example, the mobile terminal can include a plurality of displays that are arranged on a single face at a predetermined distance or integrated displays. The plurality of displays can also be arranged on different sides.

When display unit 151 and a sensor sensing touch (touch sensor) form a layered structure, which is referred to as a touch screen hereinafter, the display unit can be used as an input device in addition to an output device. The touch sensor can be in the form of a touch film, a touch sheet and a touch pad, for example.

The touch sensor can be constructed to convert a variation in pressure applied to a specific portion of the display unit or a variation in capacitance generated at a specific portion of the display unit into an electric input signal. The touch sensor can also be constructed to sense pressure of touch as well as the position and area of the touch.

When the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display unit 151.

Referring to FIG. 1, the proximity sensor 141 of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

The proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal. The audio output module 152 can include a receiver, a speaker, a buzzer, etc.

The alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module can also not only transmit haptic effects through direct contact but also allow the user to feel haptic effects through a kinesthetic sense of the user's fingers or arms. The mobile terminal can also include multiple haptic modules 154.

The memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal can also operate in relation to a web storage performing the storing function of the memory on the Internet.

The interface 170 serves as a path to external devices connected to the mobile terminal. Further, the interface receives data from the external devices or power and transmits the data or power to the internal components of the mobile terminal or transmits data of the mobile terminal to the external devices. Also, interface 170 can include a wired/wireless headset port, an external charger port, a wired/wireless data port, a memory card port, a port for connecting a device having a user identification module, an audio I/O port, a video I/O port, an earphone port, etc., for example.

The interface 170 can interface with a user identification module that is a chip that stores information for authenticating the authority to use the mobile terminal. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal through a port of the interface.

The interface can also be a path through which power from an external cradle is provided to the mobile terminal when the mobile terminal is connected to the external cradle or a path through which various command signals input by the user through the cradle are transmitted to the mobile terminal. The various command signals or power input from the cradle can be used as signals for confirming whether the mobile terminal is correctly set in the cradle.

The controller 180 controls the overall operations of the mobile terminal. For example, the controller performs control and processing for voice communication, data communication and video telephony. As shown in FIG. 1, the controller also includes a multimedia module 181 for playing multimedia. The multimedia module can be included in the controller as shown in FIG. 1 or can be separated from the controller.

Further, the controller can perform a pattern recognition process capable of recognizing handwriting input or picture-drawing input applied to the touch screen as characters or images.

The power supply 190 receives external and internal power and provides power required for the operations of the components of the mobile terminal under the control of controller 180.

The various embodiments described herein may be implemented in a recording medium readable by a computer or similar devices using, for example, software, hardware, or a combination of them.

From a viewpoint of hardware implementations, the embodiments described herein may be implemented using at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an other electronic unit configured to perform the functions described herein. In some cases, the embodiments may be implemented by controller.

From a viewpoint of software implementations, the embodiments, such as procedures and functions, may be implemented along with a separate software module configured to perform one or more of the functions and operations described herein. Software codes may be implemented using a software application written in any suitable programming language. The software codes may be stored in the memory 160 and executed by the controller 180.

Figure 2A:
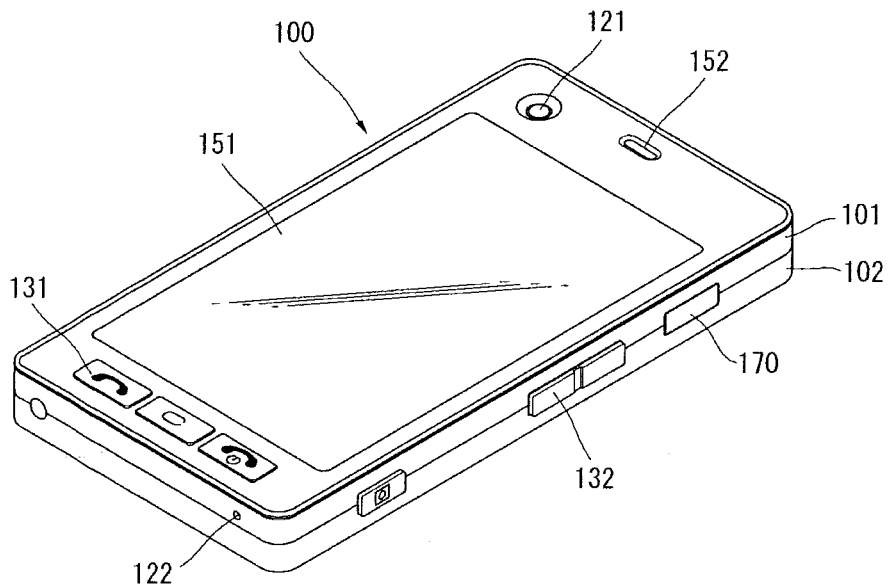
FIG. 2A is a diagram showing a front perspective view of the terminal.

FIG. 2A shows a front perspective view of the mobile terminal. In this example, the mobile terminal has a bar-type terminal body. However, the terminal may be another type such as a slide type, folder type, swing type, or swivel type.

The terminal body includes a casing (a housing, a cover, etc.) forming the exterior of the terminal. In the present embodiment, the casing may be divided into a front casing 101 and a rear casing 102. Various electronic components are embedded in a space formed between the front and rear casings. At least one middle casing may be placed between the front and rear casings. The casing(s) may be made of plastic and formed, for example, through injection molding, or may be made of a metal material such as stainless steel (STS) or titanium (Ti).

The display unit 151, audio output unit 152, camera 121, user input units 130, 131, and 132, microphone 122, and interface 170 may be placed in the terminal body, especially, in front casing 101.

The display unit may occupy most of the main face of the front casing. The audio output unit 152 and camera 121 may be placed in regions close to one of both ends of display unit 151. The user input unit 131 and microphone 122 may be placed in regions close to the other of both ends of the display unit. The user input unit 132, interface 170, etc., may be placed on sides of the front and rear casings. In other embodiments, these features may be located in different regions of the mobile terminal.

The user input unit 130 is configured to receive commands for controlling the operation of the mobile terminal, and includes user input units 131 and 132. The user input units may be collectively referred to as manipulating portions. Any tactile method of enabling a user to operate the user input units while feeling tactile may be used as the manipulating portion.

The user input units can receive various inputs. For example, user input unit 131 may receive commands such as start and end of a call, and user input unit 132 may receive commands such as those used to control the volume of the sound output from the audio output unit or to convert the display unit into a touch recognition mode.

Figure 2B:
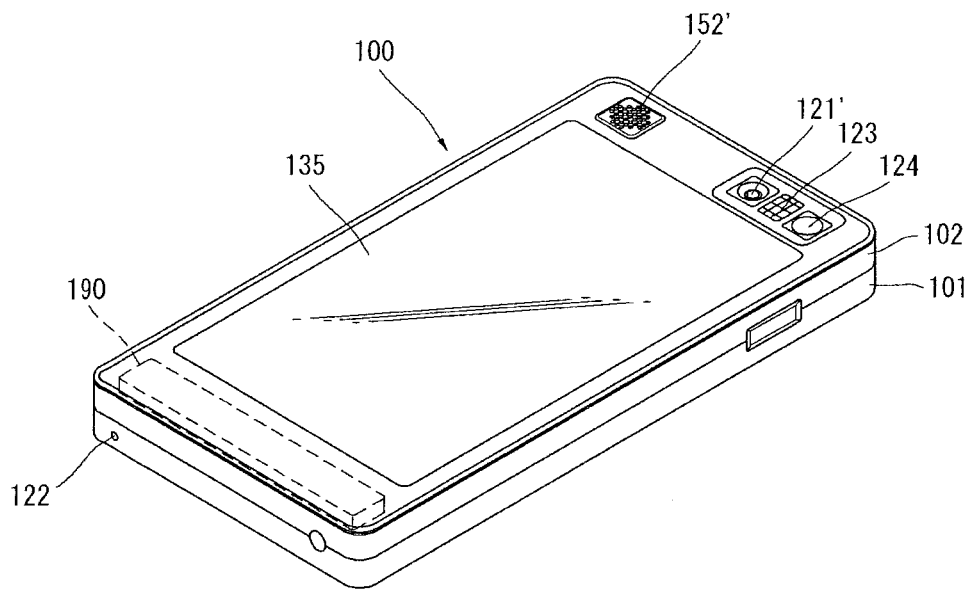
FIG. 2B is a diagram showing rear perspective view of the terminal.

FIG. 2B shows a rear perspective view of the mobile terminal shown in FIG. 2A. As shown in FIG. 2B, an additional camera 121' is attached to the rear side of the terminal body, that is, rear case 102. In this configuration, camera 121' has a photographing direction opposite to that of camera 121 shown in FIG. 2a and may have a resolution (e.g., pixel capacity) and/or size (e.g., number of pixels) different from that of camera 121 shown in FIG. 2A.

For example, in one example, camera 121 may have a relatively low resolution and/or number of pixels able to capture an image of the face of a user for transmission to a receiving part during video telephony, while camera 121' have high resolution and/or number of pixels able to capture an image of a general object. In this latter, case the captured image may not immediately be transmitted or may not be transmitted at all. The cameras may be attached to or formed in the terminal body so as to allow them to be rotated or popped-up.

As shown in FIG. 2B, a flash bulb 123 and mirror 124 may be arranged in proximity to camera 121'. The flash bulb lights an object when the camera takes a picture of the object, and the mirror allows the user to look at his or her face when the user wants to take a picture of himself using the camera.

An audio output unit 152' may be provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna may be attached to a side of the terminal body in addition to an antenna for telephone calls. The antenna forming a part of the broadcasting receiving module 111 shown in FIG. 1 can be set in the terminal body such that the antenna can be pulled out of the terminal body.

The power supply 190 for providing power to the mobile terminal is set in the terminal body, and can be included in or detachably attached to the terminal body.

A touch pad 135 for sensing touch may be attached to rear case 102 of the terminal. The touch pad can be a light-transmission type as display unit 151. In this instance, when the display unit outputs visual information through both sides, the visual information can be recognized through touch pad 135. The information output through both sides of display unit 151 can be controlled by the touch pad. In addition, a display can be attached to the touch pad such that a touch screen can be arranged even in rear case 102.

The touch pad operates in connection with display unit 151 of front case 101, and can be located in parallel with display unit 151 behind the display unit. The touch panel 135 can also be identical to or smaller than display unit 151 in terms of size.

Figure 3A:
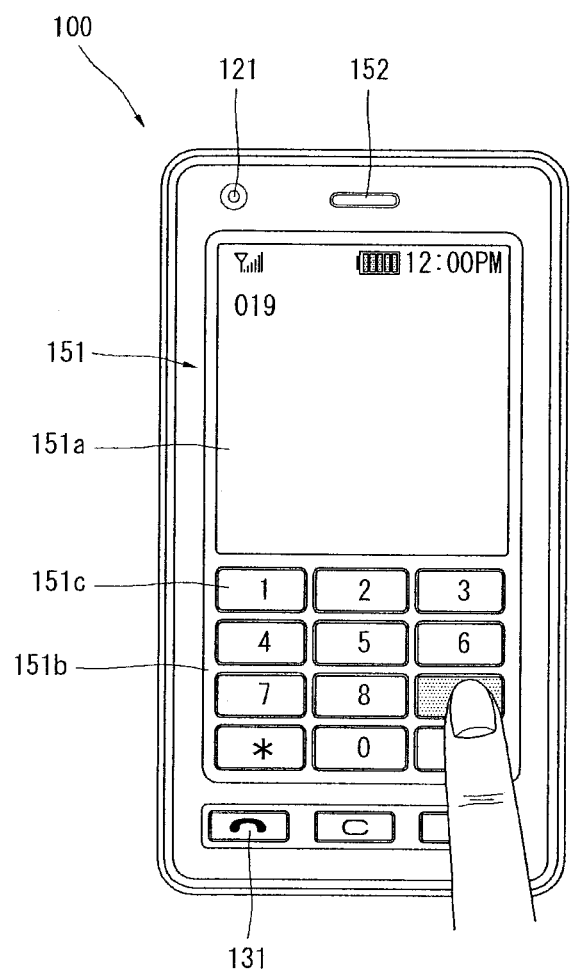
FIGS. 3A and 3B are front views of the mobile terminal illustrating an operation of the mobile terminal according to an embodiment of the present invention.
Figure 3B:
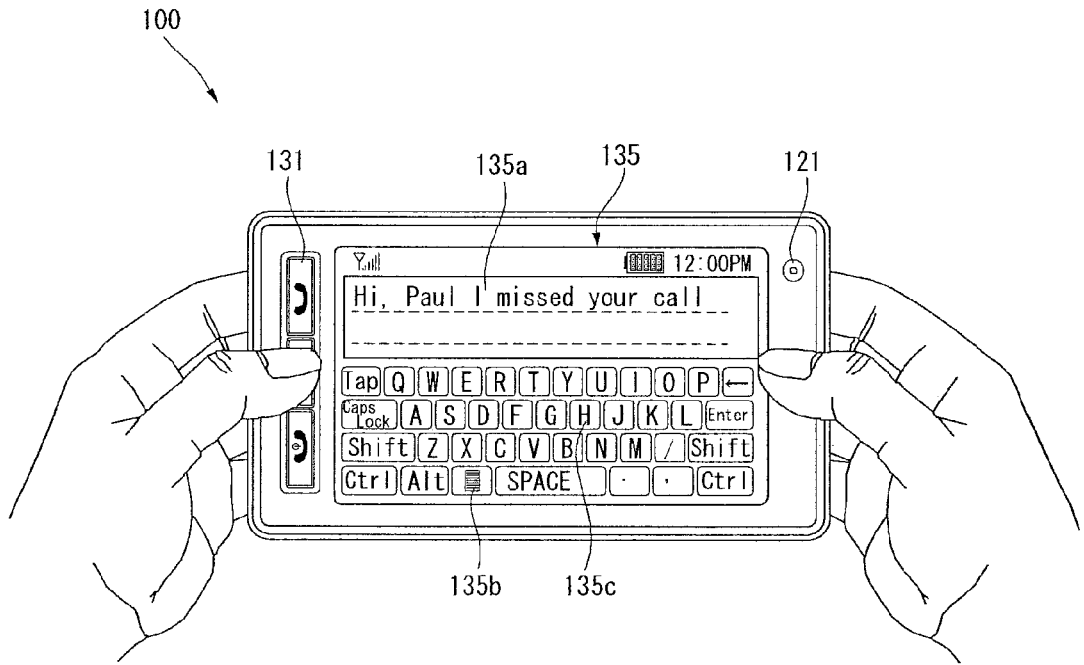

FIGS. 3A and 3B show front views of mobile terminal 100 and are provided to assist in explaining various operating states of this terminal. The display unit 151 can display various types of visual information in the form of characters, numerals, symbols, graphic or icons. To input information, at least one of the characters, numerals, symbols, graphic or icons are displayed in a predetermined arrangement in the form of a keypad. Also, the keypad can be referred to as a 'soft key.'

FIG. 3A also shows that touch applied to a soft key is input through the front side of the terminal body. The display unit 151 can be a single area or can be divided into a plurality of regions. In the latter instance, display unit 151 is constructed such that the regions interoperate with each other.

For example, and as shown in FIG. 3A, an output region 151a and an input region 151b are respectively displayed in upper and lower parts of the display unit. The input region 151b displays soft keys 151c that represent numerals used to input numbers such as telephone numbers. Thus, when a soft key 151c is touched, a numeral corresponding to the touched soft key is displayed on output region 151a. Further, when the user operates the first user input unit 131, a connection of a call corresponding to a telephone number displayed on output region 151a is attempted.

FIG. 3B shows an example of how a touch may be applied to soft keys on the rear side of the terminal body. FIG. 3B also shows a landscape orientation of the terminal body, while FIG. 3A shows a portrait orientation. In addition, display unit 151 is constructed such that an output image is converted according to a direction in which the terminal body is located or held.

Also, FIG. 3B shows the operation of the mobile terminal in a text input mode. As shown, display unit 151 includes a touch pad display 135 having an output region 135a and an input region 135b. A plurality of soft keys 135c indicating at least one of characters, symbols and numerals are arranged in the input region 135b. Further, in this embodiment, soft keys 135c are arranged in the form of QWERTY keys.

Thus, when soft keys 135c are touched through touch pad 135, the characters, numerals and symbols corresponding to the touched soft keys are displayed on output region 135a. Touch input through the touch pad can prevent the soft keys from being covered with user's fingers when the soft keys are touched, as compared to touch input through display unit 151. Further, when display unit 151 and touch pad 135 are transparent, the user can see his or her fingers located behind the terminal body, and thus can select items by touching the backside or surface of displayed keys 135c.

In addition, the user can scroll the display unit or touch pad to move an object displayed on the display unit, for example, by using a cursor or a pointer located on an icon. Also, when the user moves his or her finger on the display unit or the touch pad, the controller 180 can visually display the user's finger moving path on display unit 151. This is useful to edit an image displayed on the display unit.

When display unit 151 (touch screen) and touch pad 135 are simultaneously touched within a predetermined period of time, a specific function of the terminal can be executed. For example, the user can clamp the terminal body using his thumb and index finger. The specific function can include, for example, activating or deactivating the display unit or the touch pad, when this happens.

In accordance with one or more embodiments, it may be assumed that display unit is a touch screen, for convenience of description. As described above, the touch screen may perform both an information display function and an information input function, but it is to be noted that the embodiments described herein are not to be limited thereto. Further, a touch (to be described later) may include both a contact touch and a proximity touch. A proximity touch is described in greater detail with reference to drawings including FIG. 21.

Figure 4:
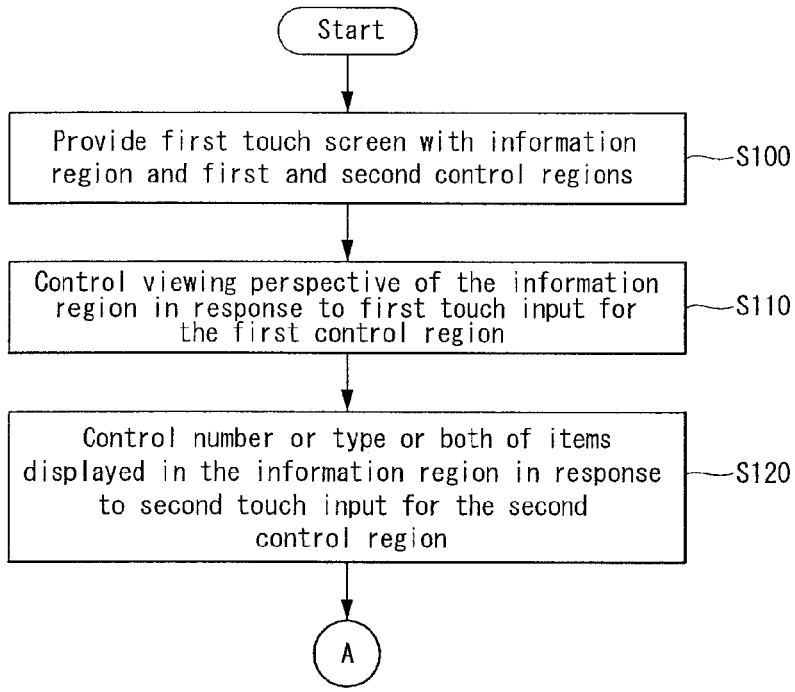
FIG. 4 is a flowchart showing steps included in a first embodiment of a method for displaying information in a mobile terminal.

FIG. 4 shows steps included in a first embodiment of a method for displaying information in a mobile terminal, and FIGS. 5A to 11C show examples of screen that may be generated by this method. The method may be implemented in a mobile terminal such as mobile terminal 100, and for illustrative purposes the steps of the method are described below with reference to FIGS. 1 to 3. However, in alternative embodiments, other types of terminals may be used.

According to this method, controller 180 provides touch screen 151 with an information region that includes one or more information items and first and second control regions for controlling the display of the information region, at step S100.

Figure 5A:
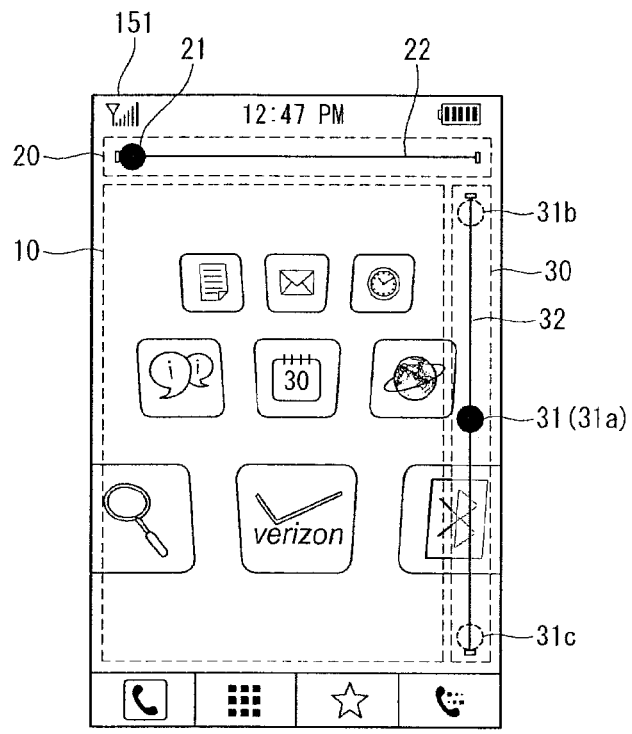
FIGS. 5A to 11C are diagrams showing examples of screens which may be generated by the mobile terminal in accordance with the aforementioned method.

FIG. 5A shows an example of a screen in which the step S100 is carried out. In this figure, the controller may provide the touch screen with an information region 10, a first control region 20, and a second control region 30.

The information region may be configured to display the one or more information items. For example, one information item may be content including at least one of text, a still picture, or a motion picture. The, or another, information item may include at least one of icons or menus. The controller may also control the form or manner in which the one or more information items are displayed in the information region in various ways. For example, the same content may be displayed in icon form or text or image form.

The first control region 20 may control a viewing perspective of information region 10 (or a viewing perspective of the one or more information items displayed in the information region). The second control region 30 may control at least one of the number or type of information items provided in information region 10. The information region 10 may partially overlap the first or second control regions or may overlap both.

FIGS. 5A to 7 show examples in which information region 10 may partially overlap second control region 30. Each of the first and second control regions 20 and 30 may be or include a user interface (UI) for performing the above-described or other control functions and may be configured to provide various forms of user interfaces.

As shown in FIG. 5A, first control region 20 may include, for example, a first slider 21 movable by touch input and a first bar 22 (e.g., a moving path of first slider 21). The second control region 30 may include, for example, a second slider 31 movable by touch input and a second bar 32 (e.g., a moving path of second slider 31).

A user may drag the first slider and the second slider to perform the control functions. Further, when the user touches a specific point on first bar 22, first slider 21 can be moved to the touched point on the first bar. Similarly, when the user touches a specific point on second bar 32, second slider 31 can be moved to the touched point on the second bar.

At least one of the first or second control regions 20 and 30 may correspond to the above-described user interface and may be configured to include an icon for receiving touch input.

The controller 180 controls a viewing perspective of information region 10 in response to a first touch input for first control region 20 at step S110. According to one embodiment, the controller may control information region 10 so that the information region has a 2-dimensional (2D) or a 3-dimensional (3D) viewing perspective.

Figure 5B:
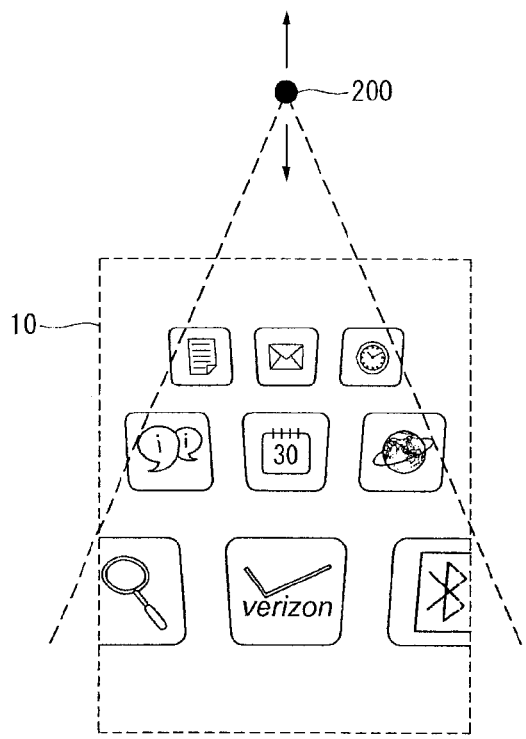
Figure 6:
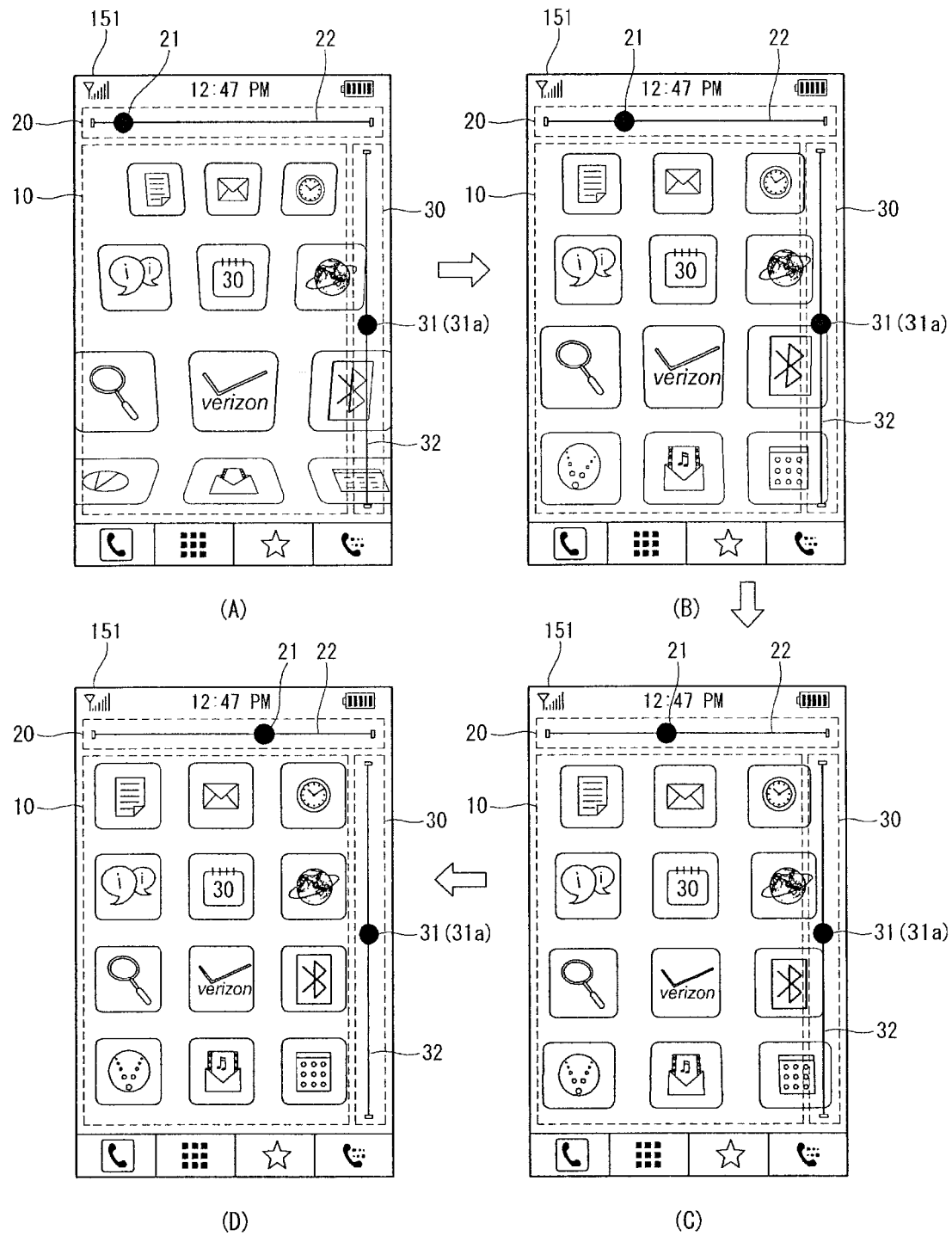

FIG. 5B shows a 3D viewing perspective of information region 10, and FIGS. 6A-D and 7A-C show examples of how the viewing perspective of information region 10 is controlled according one embodiment.

Referring to FIGS. 6A-D, when a position on first bar 22 of first slider 21 is moved, controller 180 changes the viewing perspective of the information region. FIGS. 6A to 6D illustrate how shapes of the icons change as the viewing perspective of information region 10 changes from a 3D perspective to a 2D perspective.

In the 3D perspective, the screen is presented so that shapes of the icons are given a feeling of space. That is, in order to achieve a 3D effect, a feeling of space is assigned to the information region by assigning different perceptions of depths to a first side of information region 10 and a second side opposite to the first side (for example, as shown in FIGS. 5A and 6A).

To achieve this effect, the 3D viewing perspective may have a virtual focus. Referring to FIG. 5B, the 3D perspective of information region 10, including a plurality of items, may have the virtual focus shown by reference numeral 200. The controller may control the information region so that the information region has the 3D perspective, thereby making a user feel the information region 10 is a 3D space.

The 2D viewing perspective may refer to a shape in which a feeling of space, or depth, is not assigned to the information region 10. In accordance with one embodiment, this may be achieved by assigning a same depth to the entire information region.

As described above, controller 180 may control the viewing perspective of the information region. The controller may control the information region so that the information region has different 3D viewing perspectives according to control through first control region 20. For example, the controller may control 3D viewing perspectives by fixing the depth of the first side and changing the depth of the second side.

Further, the different 3D viewing perspectives may have different virtual focuses. For example, referring to FIG. 5B, when virtual focus 200 is moved up and down, the 3D viewing perspectives of information region 10 may vary accordingly. Meanwhile, when the virtual focus upwardly moves infinitely, the viewing perspective of information region 10 may be given a two-dimensional (2D) perspective.

For example, FIGS. 6A and 6B show examples in which information region 10 has a 3D viewing perspective. However, it can be seen that the 3D viewing perspectives of FIGS. 6A and 6B differ from each other.

When the controller controls the depth of the second side so that it approaches the depth of the first side, the viewing perspective of the information region looks like a 2D viewing perspective.

Further, the controller may control the information region so that the information region has different 2D viewing perspectives according to control through the first control region 20. For example, the controller may control the 2D viewing perspectives by changing a certain depth over the entire information region. When the depth of the entire information region is changed, a user feels as if the information region becomes distant from him or close to him.

If the effect is such that the information region is perceived to be distant from the user, the size of each of the displayed items in the information region decreases, so that the number of items that can be displayed in the information region increases. For example, in the case where information region 10 includes a 2D viewing perspective, the controller may control the number of information items displayed in the information region according to control through the first control region 20.

Figure 7:
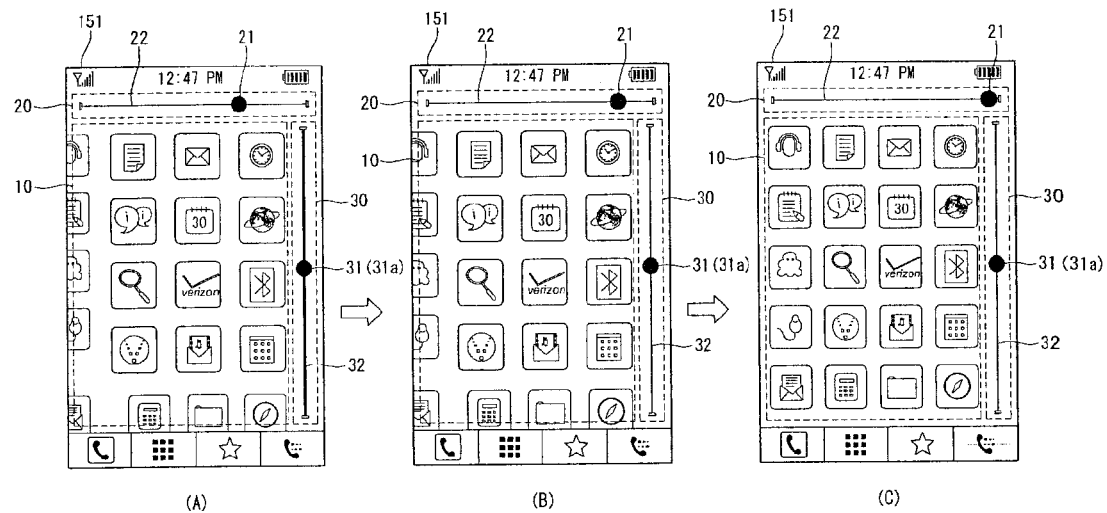

Referring to FIG. 7, when a position on first bar 22 of first slider 21 moves, the controller controls the number of information items displayed in the information region. Meanwhile, the controller may provide first control region 20 with a section (i.e., the control section of the 2D viewing perspective) where a display method of the information region is controlled. For example, in the case where information region 10 is controlled to have a 2D viewing perspective, the controller may display one or more information items in a thumbnail mode and a list mode according to control through first control region 20. This is described in greater detail below with reference to FIGS. 8 to 10.

According to one embodiment, the controller may control the viewing perspective of information region 10 continuously or discontinuously. For example, in the case where a 3D viewing perspective of the information region is continuously controlled, virtual focus 200 may be continuously changed. At this time, a position on first bar 22 of first slider 21 may be continuously moved.

In the case where a 3D viewing perspective of the information region is discontinuously controlled, the virtual focus may be charged discontinuously, or discretely. At this time, a position on first bar 22 of first slider 21 may be discontinuously (or discretely) changed. That is, a plurality of positions at which the first slider can be moved may be previously set on the first bar. The type of continuous or discontinuous control through the first control region 20 may be achieved in a similar manner for the second control region 30.

Figure 8:
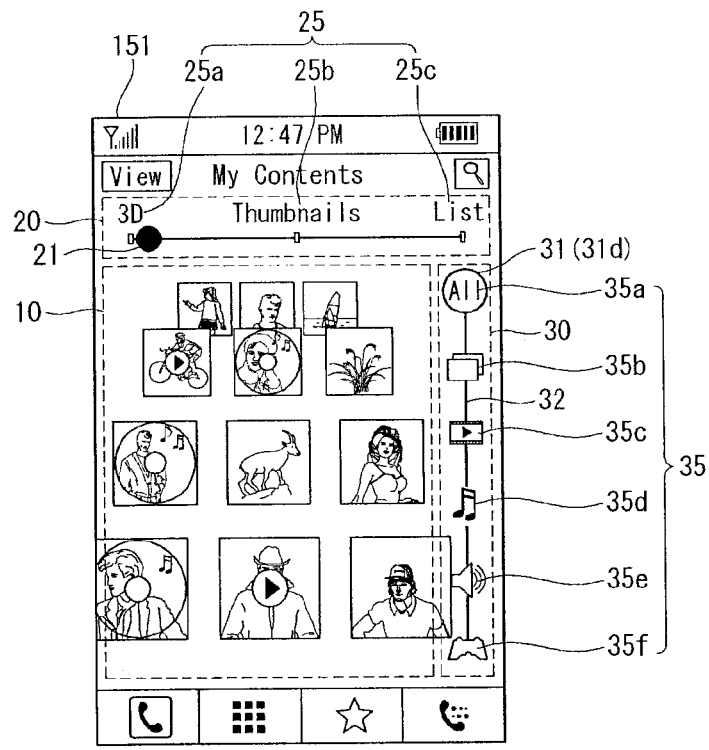

FIGS. 8 to 11C show additional examples of how the information region may be controlled. In FIG. 8, an example of a screen is shown in which step S100 is carried out. Similar to FIG. 5A, the controller may provide touch screen 151 with an information region 10, a first control region 20, and a second control region 30.

As shown in FIG. 8, the controller provides the first control region 20 with a first identifier group 25 and the second control region 30 with a second identifier group 35. For example, the first identifier group may include, for example, a $(1-1)^{th}$ identifier 25a, a $(1-2)^{th}$ identifier 25b, and a $(1-3)^{th}$ identifier 25c. And, the second identifier group 35 may include, for example, a $(2-1)^{th}$ identifier 35a, a $(2-2)^{th}$ identifier 35b, a $(2-3)^{th}$ identifier 35c, a $(2-4)^{th}$ identifier 35d, a $(2-5)^{th}$ identifier 35e, and a $(2-6)^{th}$ identifier 36c.

The first and second identifier groups can improve a user's intuitiveness for control through first and second control regions 20 and 30, respectively. For example, when a first slider 21 is placed at the $(1-1)^{th}$ identifier 25a, the viewing perspective of the information region may be given a 3D perspective. When the first slider 21 is placed at the $(1-2)^{th}$ identifier 25b, the viewing perspective of the information region may be given a 2D perspective displayed in thumbnail mode. Further, when the first slider s placed at the (1-3)$^{th}$ identifier 25c, the viewing perspective of the information region may be given a 2D perspective in the list mode.

As described above, a user can expect a display of information region 10 to correspond to a position of the first slider 21, while seeing the first identifier group 25.

Figure 9:
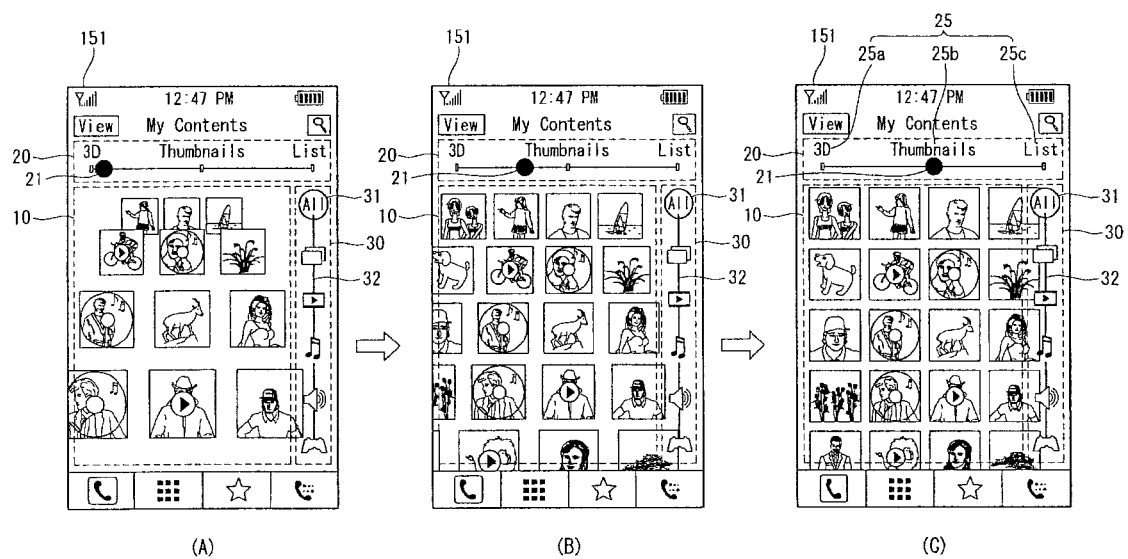
Figure 10:
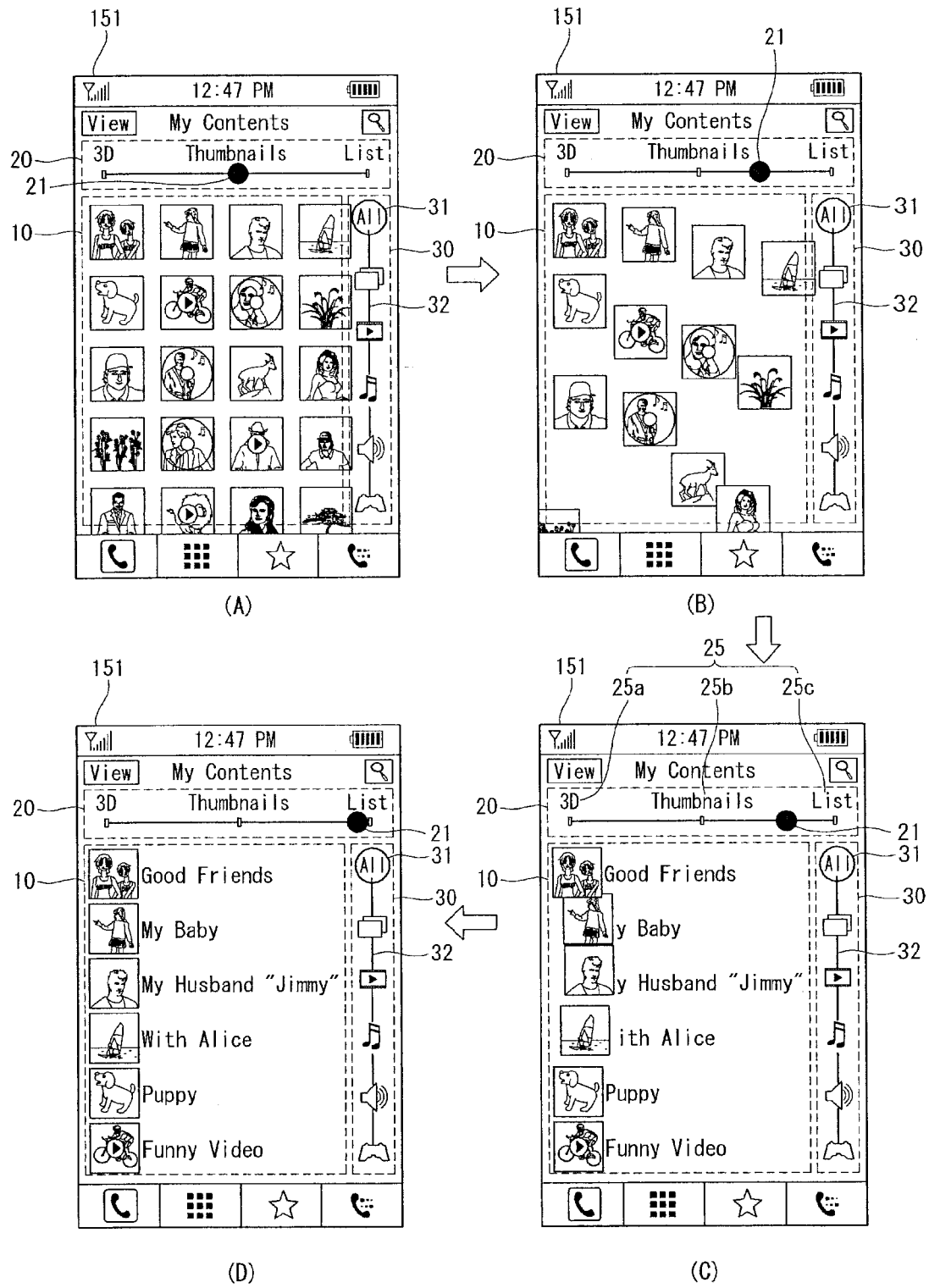

Referring to FIG. 9, when a position on first bar 22 of first slider 21 moves, the controller changes the viewing perspective of information region 10. For example, the information region shown in FIG. 9A may be given a 3D perspective having a first virtual focus, and the information region shown in Figure B may be given a 3D perspective having a second virtual focus different from the first virtual focus.

Further, in FIG. 9C, first slider 21 may be placed at a point corresponding to the (1-2)$^{th}$ identifier 25b on the first bar 22. Accordingly, the information region shown in FIG. 9C may be given a 2D viewing perspective displayed in thumbnail mode.

When the first slider is placed at a point corresponding to the (1-2)$^{th}$ identifier 25b through the first identifier group 25, a user can expect that the viewing perspective of the information region will have a 2D perspective, and information items included in the information region 10 will be displayed in thumbnail mode.

FIGS. 10A-D shows examples of how information items in the information region may be displayed in a list mode. When a position of first slider 21 moves from the (1-2)$^{th}$ identifier 25b to the (1-3)$^{th}$ identifier 25c, the information items in the information region may be moved and displayed in a list mode as shown in FIG. 10D.

In list mode, both a representative image and brief information of the information items in the information region may be displayed as shown in FIG. 10D. Alternatively, in list mode, only brief information of the information items may be displayed (not shown). The brief information may include, for example, the titles of the information items, a point of time at which each information item has been created or received, and/or other supplementary information about the information items.

Referring back to FIG. 4, the controller may control at least one of the number or type of one or more information items displayed in the information region in response to a second touch input for second control region 30, at step S120.

Figure 11A:
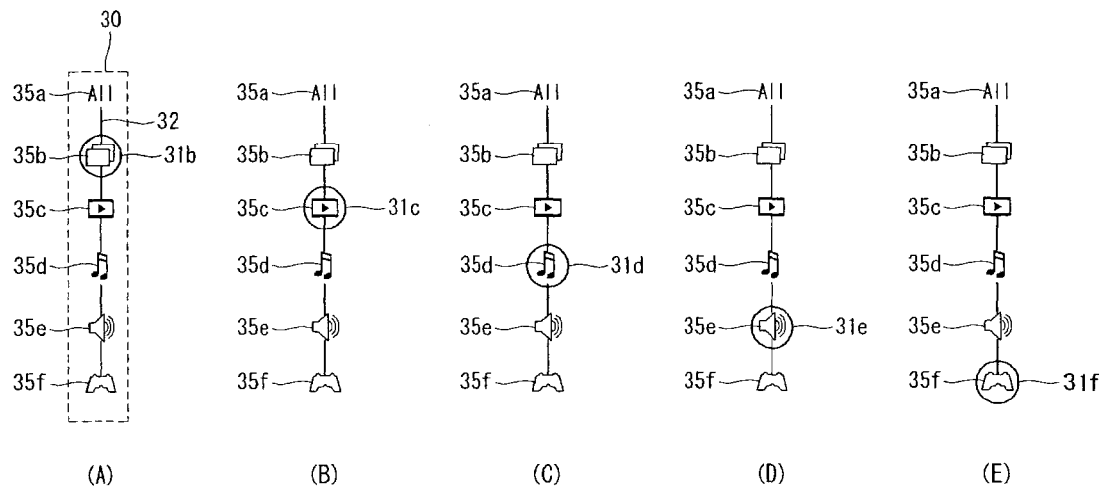
Figure 11B:
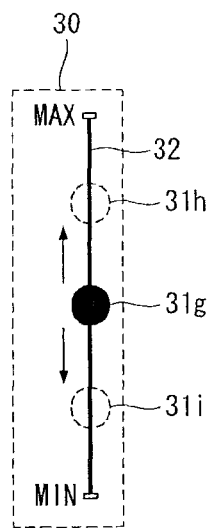
Figure 11C:
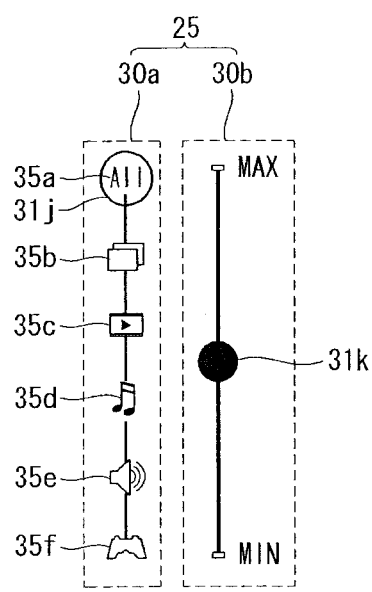

FIG. 11A shows an example of how second control region 30 may control the type of at least one information item in the information region, FIG. 11B shows an example how the second control region may control the number of information items in the information region, FIG. 11C shows an example of how the second control region may control the number and type of information items in the information region.

The controller may control the type of the at least one information item in the information region in response to a second touch input for the second control region 30.

Referring to FIG. 11A, the (2-1)$^{th}$ identifier 35a can indicate all content stored in the memory 160 or a certain folder (for example, a folder "My Contents"). The (2-2)$^{th}$ identifier 35b can indicate text stored in the memory 160 or the certain folder. The (2-3)$^{th}$ identifier 35c can indicate motion picture content stored in the memory 160 or the certain folder. The (2-4)$^{th}$ identifier 35d can indicate music content stored in the memory 160 or the certain folder. The (2-5)$^{th}$ identifier 35e can indicate voice content stored in the memory 160 or the certain folder. The (2-6)$^{th}$ identifier 36c can indicate game content stored in the memory 160 or the certain folder.

When the second slider 31 is placed at a specific one of the plurality of identifiers 35a, 35b, 35c, 35d, 35e, and 35f included in identifier group 35, the controller may display data, corresponding to the specific identifier at which the second slider 31 is placed, in information region 10. For example, when the second slider is placed at the (2-3)$^{th}$ identifier 35c as shown in FIG. 11B, the controller may display motion picture content, stored in memory 160 or a certain folder or area, in the information region. And, when the second slider is placed at the (2-6)$^{th}$ identifier 35f, the controller may display game content, stored in memory 160 or a certain folder area, in the information region.

In FIG. 11A, the position of second slider 31 may change discontinuously, or discretely. For example, the position of the second slider may be placed at any one of the plurality of identifiers 35a, 35b, 35c, 35d, 35e, and 35f.

The controller may control the number of the one or more information items displayed in information region in response to a second touch input for second control region 30. For example, the controller may provide touch screen 151 with second control region 30 as shown in FIG. 11B. Here, when second slider 31g moves on second bar 32, the controller changes the number of information items displayed in the information region.

For example, when second slider 31g moves to the position corresponding to reference numeral '31h', the controller may increase the number of information items displayed in the information region. When the second slider 31g moves to a position corresponding to reference numeral '31i,' the controller may decrease the number of information items displayed in the information region.

The controller may control the number and type of one or more information items displayed in the information region in response to a second touch input for the second control region 30.

Referring to FIG. 11C, the second control region 30 may include a (2-1)$^{th}$ control region 30a and a (2-2)$^{th}$ control region 30b. The (2-1)$^{th}$ control region 30a is a control region for controlling the type of information items displayed in information region 10, as described above with reference to FIG. 11A. The (2-2)$^{th}$ control region 30b is a control region for controlling the number of information items displayed in the information region, as described above with reference to FIG. 11B.

As described above, the controller may provide touch screen 151 with second control region 30 configured to control both the number and type of information items displayed in information region 10.

FIGS. 12 to 14B show examples of external appearances of a mobile terminal that may be used to implement various embodiments described herein. These embodiments, and the embodiments which follow, may be implemented in a mobile terminal that includes a first body 101 and a second body 102. The first body and second body are coupled together by a coupling unit 195, to form a foldable-type terminal.

Figure 14A:
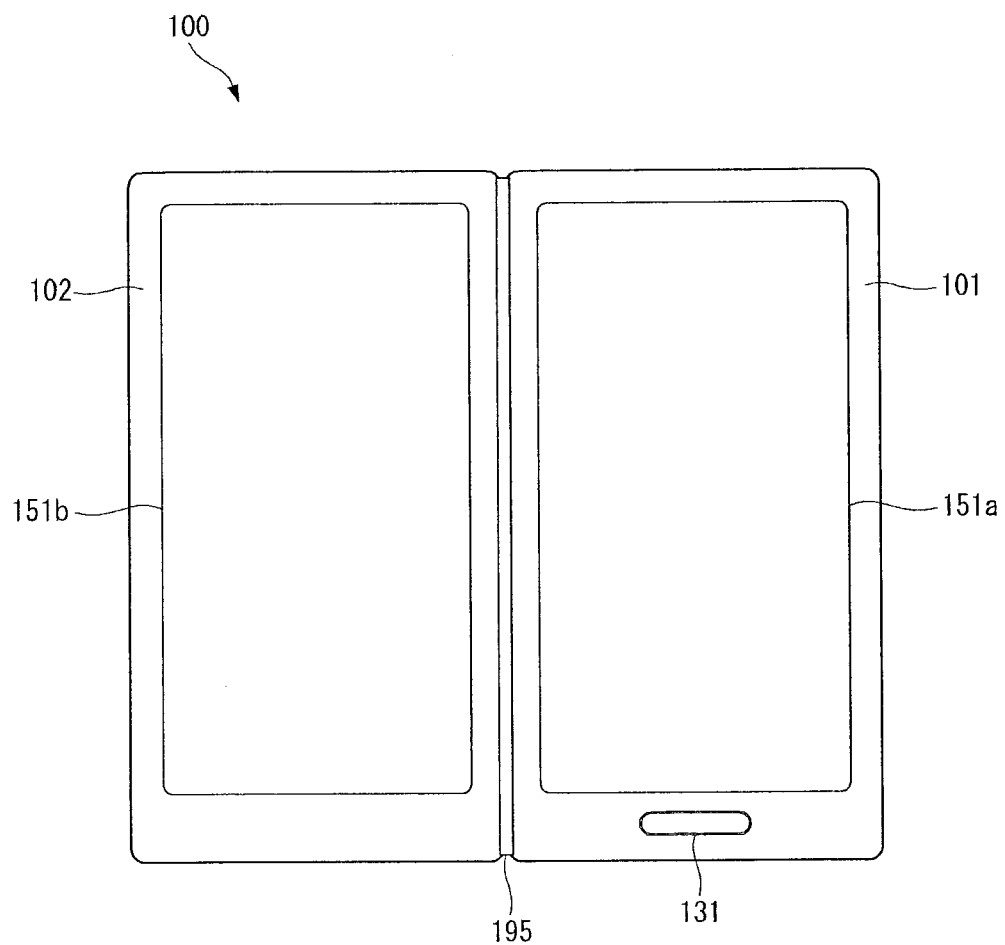
Figure 14B:
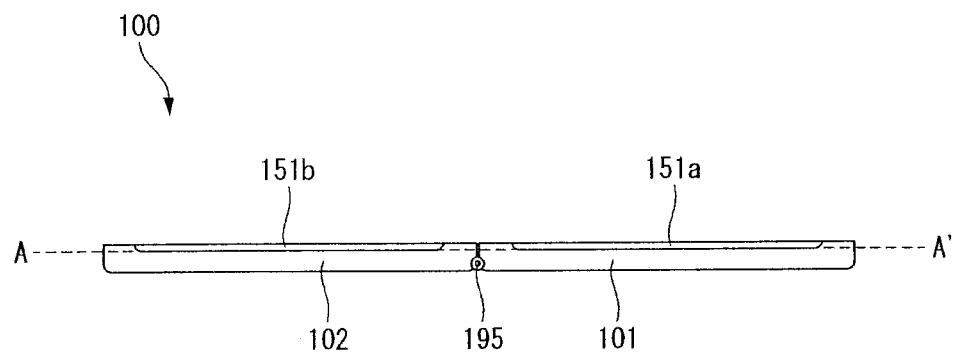

FIG. 12 shows an example in which the first body and second body are in a closed state, FIG. 13 shows an example in which the first and second bodies are in a half-open state, and FIGS. 14A and 14B show examples in which the first and second bodies are in a fully open state. A user can open and close the first body and second body 102, as shown, for example, in FIGS. 12 to 14B.

The first body includes a first touch screen 151a and the second body includes a second touch screen 151b. Each touch screen is configured to perform both the information input function and the information display function. The information input function may be performed in a touch manner.

One side of the first body equipped with first touch screen 151a and one side of the second body equipped with second touch screen 151b may not internally touch each other when the first and second bodies are in a closed state. Referring to FIG. 12, when the first and second bodies are in a closed state, the first and second touch screens 151a and 151b do not internally touch each other.

When the first and second bodies are in a fully open state, one side of the first body equipped with first touch screen 151a and one side of the second body equipped with second touch screen 151b may be included substantially in a same face. Referring to FIG. 14B, when in a fully open state, the first and second touch screens may be included substantially in the same face A-A'.

It is to be noted that the folding operations of the first and second bodies are not limited to the examples shown in FIGS. 14A and 14B. For example, an angle α formed by the first body and second body may range from 0° to 180°, as shown in FIGS. 12 to 14B. Further, the first and second bodies may be coupled together by coupling unit 195 so that the angle α formed by first body 101 and second body 102 is 180° or more.

The controller may detect the open or closing state of the first body and second body and an angle formed between them using sensing unit 140.

Further, the controller may detect a direction in which first touch screen 151a or second touch screen 151b, or both, are oriented using sensing unit 140. For example, referring to FIG. 14A, mobile terminal 100 may be placed on a desk so that, in the state in which the angle formed by the first and second bodies is 180°, the first and second touch screens 151a and 151b are directed toward the surface of the earth or toward a direction opposite to the surface of the earth. The controller can also detect the posture, orientation, or direction of the mobile terminal.

The sensing unit 140 may include at least one of a hall sensor, a 3-axis or 6-axis motion sensor, a terrestrial magnetic sensor, or an acceleration sensor in order to detect the posture, orientation, or direction of the mobile terminal. In the embodiments which follow, as with FIGS. 12 to 14B, it is assumed that the mobile terminal includes first touch screen 151a and second touch screen 151b.

Figure 15:
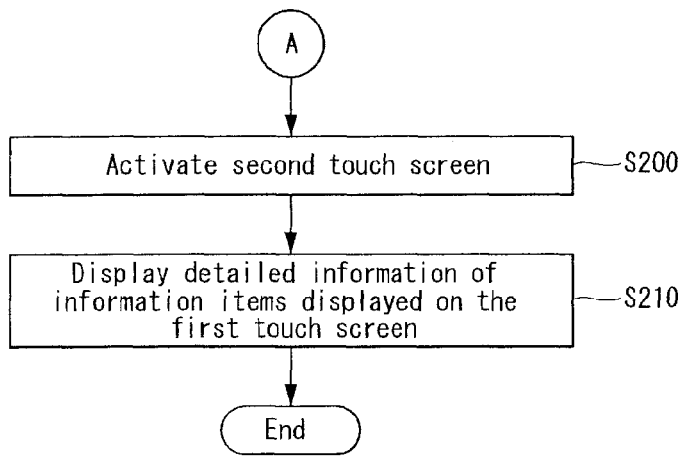
FIG. 15 is a flowchart showing steps included in a second embodiment of a method for displaying information in a mobile terminal.
Figure 16:
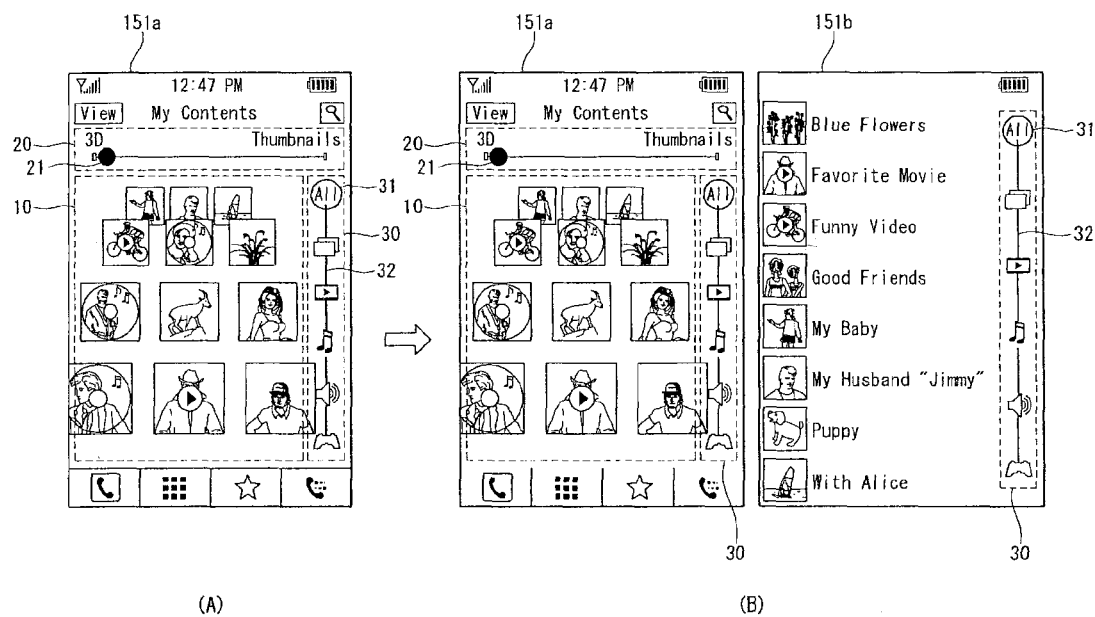
FIGS. 16 and 17 are diagrams showing examples of screens that may be generated by the mobile terminal in accordance with the method of the second embodiment.
Figure 17:
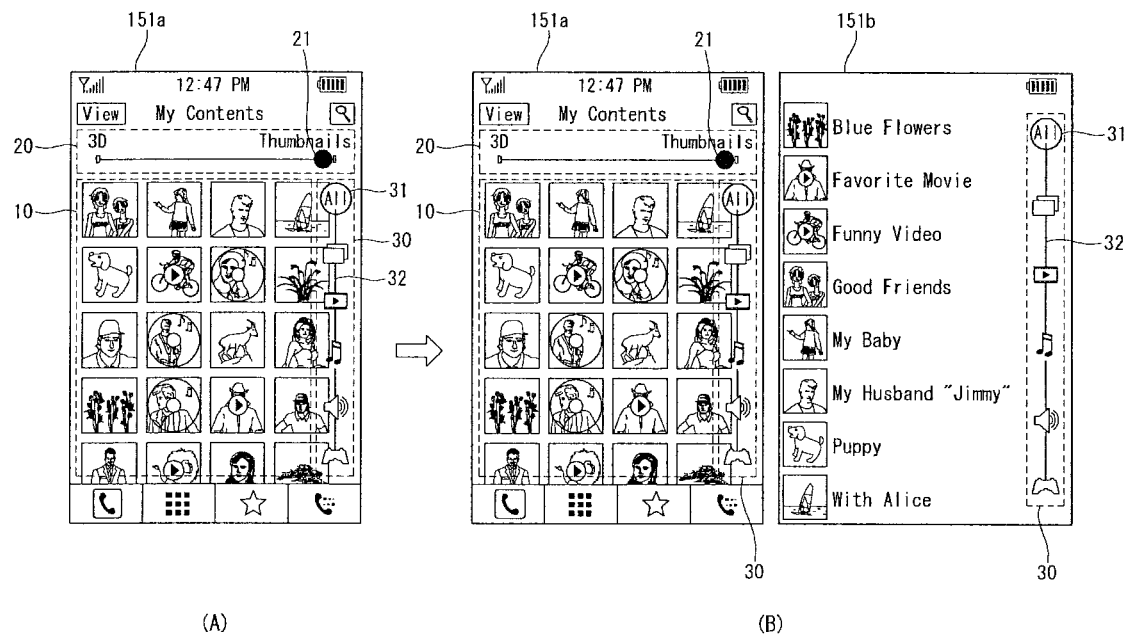

FIG. 15 shows steps included in a second embodiment of a method for displaying information in a mobile terminal, and FIGS. 16 and 17 show examples in which the second embodiment may be implemented.

The method for displaying information in a mobile terminal according to the second embodiment may be implemented in mobile terminal 100 described with reference to FIGS. 1 to 3 and FIGS. 12 to 14B, although another type of terminal may also be used. Also, this second embodiment may be implemented with the first embodiment, which is used for displaying information in a mobile terminal. It is assumed that touch screen 151 described in connection with the first embodiment is a first touch screen 151a in the second embodiment.

The controller activates a second touch screen 151b at step S200. When the second touch screen is activated, the controller displays detailed information about at least one information item displayed in first touch screen 151a on the second touch screen 151b, at step S210.

The activation or deactivation of a touch screen (e.g., second touch screen 151b) will first be described. When second touch screen 151b is deactivated, the controller does not receive a touch signal through the second touch screen or does not perform any operation although the touch signal is received. In other words, although a user touches second touch screen 151b when the second touch screen i deactivated, no change will be made in the mobile terminal.

The deactivation state of the second touch screen may include two kinds of modes. In the first mode, controller 180 displays information through second touch screen 151b (for example, an LCD is in an on state), and a touch signal is not received through the second touch screen. In the second mode, the second touch screen is fully off. When the second touch screen is fully off, the controller may not receive a touch signal through the second touch screen and also does not display any information on the second touch screen.

Various examples are discussed of when the second touch screen is activated. One example includes the case where the status of the mobile terminal changes from the status shown in FIG. 12 to the status shown in FIGS. 14A and 14B. In other words, the mobile terminal changes from a closed state to a fully open state.

Further, for example, when a key signal is received through a specific key included in the key pad of user input unit 130, the state of second touch screen 151b may change from an inactive state to an active state.

FIGS. 16A and B show examples in which steps S200 and S210 are performed when the viewing perspective of information region 10 has a 3D perspective. More specifically, FIG. 16A shows an example in which the mobile terminal is in a closed state as shown in FIG. 12, and FIG. 16B shows an example in which the mobile terminal is in a fully open state as shown in FIGS. 14A and 14B.

FIGS. 17A and B show examples in which steps S200 and S210 are performed when the viewing perspective of information region 10 has a 2D perspective. More specifically, FIG. 17A shows an example in which the mobile terminal is in a closed state as shown in FIG. 12, and FIG. 17B shows an example in which the mobile terminal is in a fully open state as shown in FIGS. 14A and 14B.

Referring to FIGS. 16A and B and 17A and B, when the state of mobile terminal 100 changes from closed to fully open, the controller changes second touch screen 151b from an inactive to an active state and displays detailed information about information items, displayed in information region 10, on the second touch screen 151b. The detailed information of the information items is a relative concept. In other words, the information items displayed on second touch screen 151b are shown in more detail than the information items displayed on first touch screen 151a.

For example, only an image for a specific information item may be displayed on the first touch screen 151a, and both an image and text for the specific information item may be displayed on the second touch screen 151b. In one particular example, both an image and simple text for a specific information item may be displayed on the first touch screen, and both an image and detailed text for the specific information item may be displayed on the second touch screen. Alternatively, both an image and simple text for a specific information item may be displayed on the first touch screen, and detailed text for the specific information item may be displayed on the second touch screen.

In FIGS. 16A and B and FIGS. 17A and B, when second touch screen 151b is activated, the controller displays images and titles of respective information items, displayed in information region 10 of first touch screen 151a, on second touch screen 151b.

Figure 18:
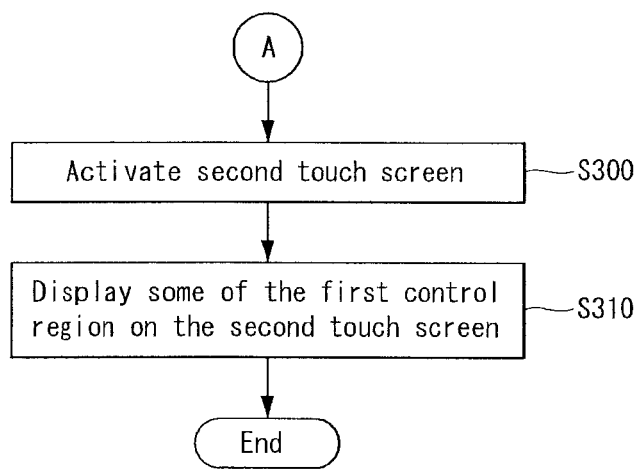
FIG. 18 is a flowchart showing steps included in a third embodiment of a method for displaying information in a mobile terminal.

FIG. 18 shows steps include in a third embodiment of a method for controlling the display of information in a mobile terminal, and FIGS. 19A and B and 20A and B showing examples of screens relating to the third embodiment. This method may be implemented using mobile terminal 100 as described with reference to FIGS. 1 to 3 and 12 to 14B, or another terminal.

The method of displaying information according to the third embodiment may be implemented with the methods according to the first and/or second embodiments. Also, the touch screen 151 described in connection with the first embodiment may be touch screen 151a of the third embodiment.

According to this method, the controller may activate second touch screen 151b at step S300. When the second touch screen is activated, the controller provides the second touch screen 151b with some of the first control region 20 displayed on the first touch screen 151a at step S310.

Referring to FIG. 19A, first control region 20 displayed on first touch screen 151a includes a $(1-1)^{th}$ identifier 25a and a $(1-2)^{th}$ identifier 25b. When the second touch screen 151b is activated, the controller provides the second touch screen 151b with a $(1-3)^{th}$ identifier 25c as part of the first control region 20 as shown in FIG. 19B.

FIG. 19B shows an example in which, when the second touch screen 151b is activated, some of the first control region 20 not provided on the first touch screen 151a is provided on the second touch screen 151b.

It is, however, to be noted that the third embodiment is not limited to the above examples. For example, when second touch screen 151b is activated in the state in which the $(1-1)^{th}$ identifier 25a, the $(1-2)^{th}$ identifier 25b, and the $(1-3)^{th}$ identifier 25c are displayed on the first touch screen 151a, the $(1-3)^{th}$ identifier 25c may be displayed on the second touch screen 151b.

In the case where some of the first identifier group 25 is displayed on the second touch screen 151b, the first bar 22 may also expand to the second touch screen 151b and be displayed thereon.

Figure 20:
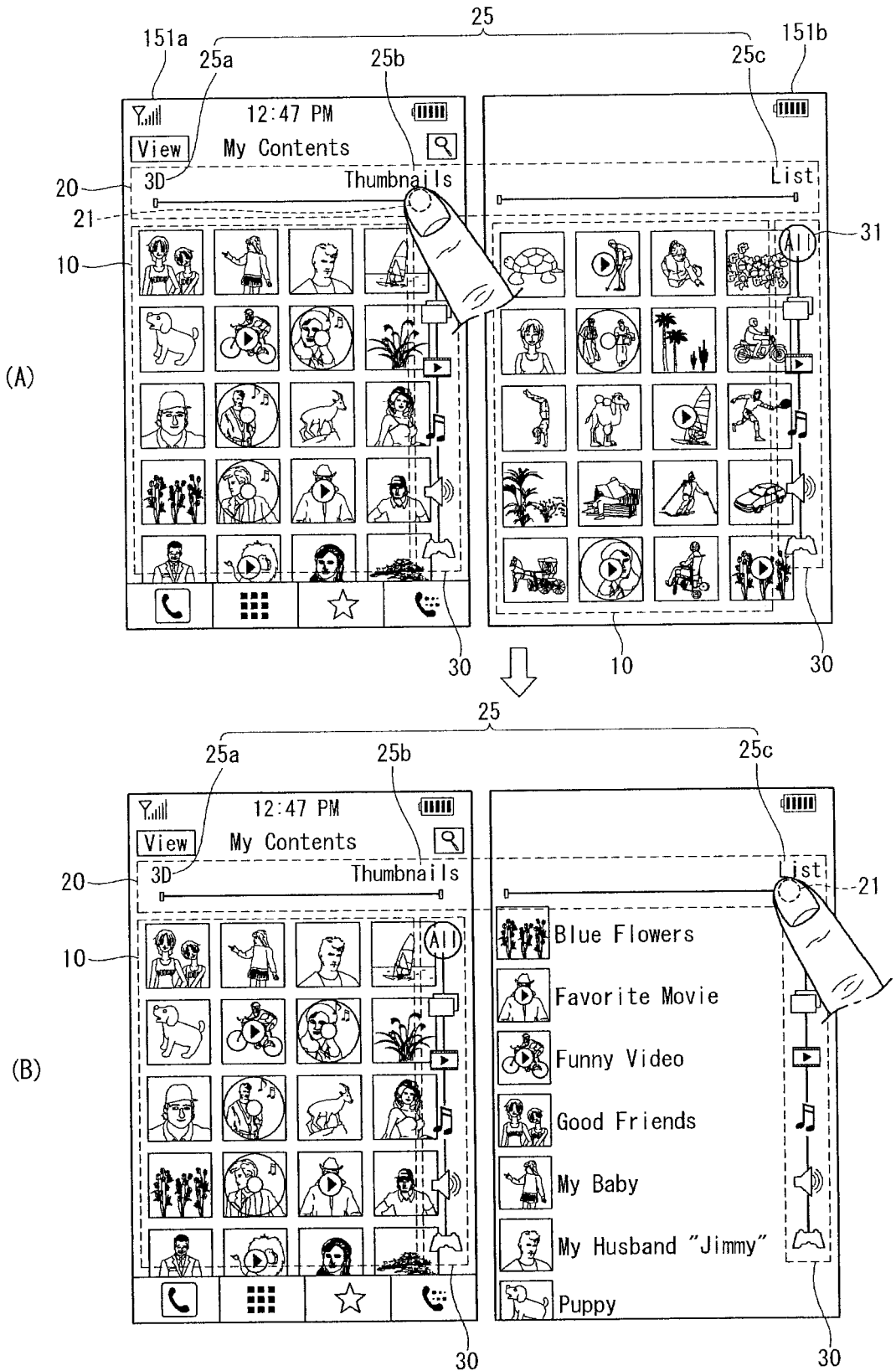

FIGS. 20A and B shows examples in which the mobile terminal is controlled through the expanded first control region 20, in a case where some of the first control region 20 expands to the second touch screen 151b. Referring to one or more of these figures, when a user moves first slider 21 up to the $(1-3)^{th}$ identifier 25c on first bar 22 displayed on the second touch screen 151b through a touch and drag operation, the controller can display detailed information about information items, displayed in the information region of the first touch screen 151a, on the second touch screen 151b.

FIG. 20A shows an example in which a display form of information items displayed on the first touch screen 151a is not changed. However, the third embodiment is not limited to the above example. For example, as shown in FIG. 20B, the controller may display detailed information of information items, displayed in the information region, on both the first touch screen 151a and the second touch screen 151b.

Figure 19:
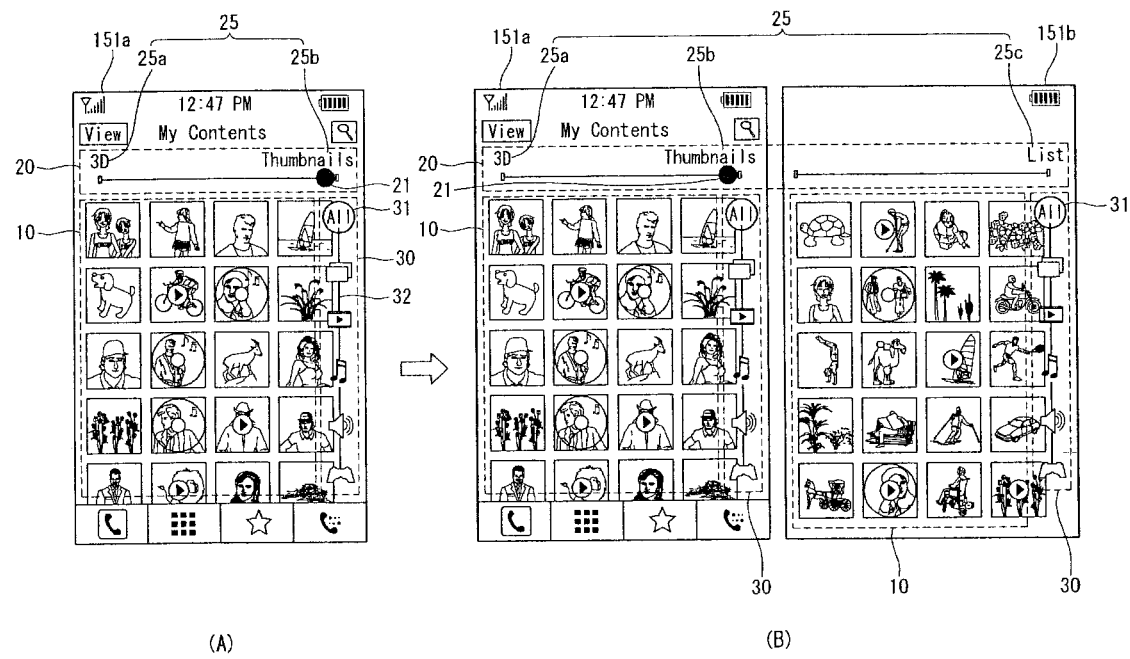
FIGS. 19 and 20 are diagrams showing examples of screens that may be generated by the mobile terminal in accordance with the method of the third embodiment.

Meanwhile, when the second touch screen 151b is activated, the controller may display some of the first control region 20, displayed on the first touch screen 151a, and the second control region 30 on the second touch screen 151b, as shown in FIG. 19.

Here, the controller may receive control commands, received through second control region 30, through first touch screen 151a and second touch screen 151b, respectively.

Meanwhile, when second touch screen 151b is activated, the controller may copy or move only second control region 30 to second touch screen 151b without moving or expanding first control region 20.

Figure 21:
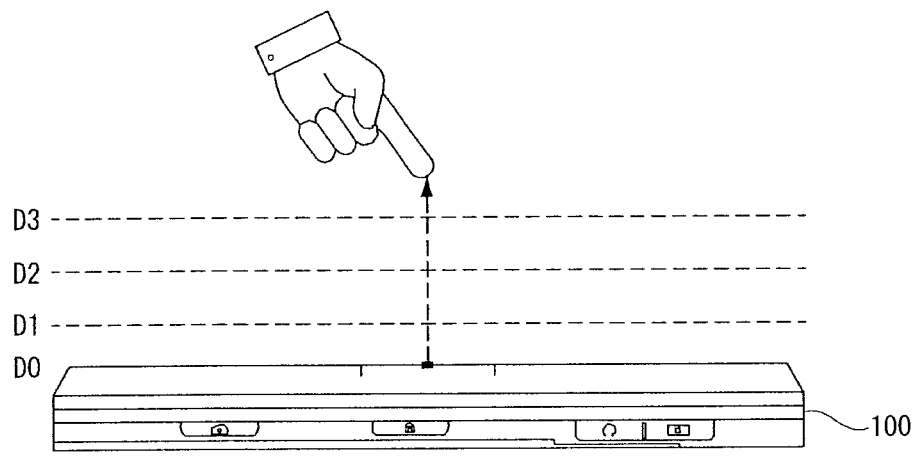
FIG. 21 is a diagram showing an example of a proximity depth of a proximity sensor used in accordance with one or more of the aforementioned embodiments.

The proximity sensor 141 described above with reference to FIG. 1 will now be explained in greater detail with reference to FIG. 21, which shows a proximity depth of the proximity sensor. As shown in FIG. 21, when a pointer such as a user's finger approaches the touch screen, proximity sensor 141 located inside or near the touch screen senses the approach and outputs a proximity signal.

The proximity sensor can be constructed such that it outputs a proximity signal according to the distance between the pointer approaching the touch screen and the touch screen (referred to as "proximity depth"). The distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 21 shows a section of the touch screen in which proximity sensors capable of sensing three proximity depths are arranged. Of course, proximity sensors capable of sensing less than three or more than three proximity depths can be arranged in the touch screen.

As shown in FIG. 21, when the pointer (user's finger in this example) completely comes into contact with the touch screen (D0), the controller recognizes this action as the contact touch. When the pointer is located within a distance D1 from the touch screen, the controller 180 recognizes this action as a proximity touch of a first proximity depth. Similarly, when the pointer is located in a range between the distance D1 and a distance D2 from the touch screen, the controller 180 recognizes this action as a proximity touch of a second proximity depth.

When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller can recognize the proximity touch as various input signals according to the proximity distance and proximity position of the pointer with respect to the touch screen and perform various operations according to the input signals.

The embodiments of the methods described herein may be implemented or otherwise controlled by one or more computer or application programs, and may be implemented in digital computers that execute the programs using a computer-readable recording medium. The program may include software having code segments that perform all or various steps of the methods. Programs or code segments can also be stored in a processor readable-medium and transmitted.

The computer-readable recording mediums include all types of recording mediums and devices that are capable of storing data readable by computing systems. Examples of the computer-readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

The mobile terminals and the methods according to the embodiments described herein may have one or more of the following advantages.

According to one embodiment, the viewing perspective of an information region provided in the display unit can be controlled. A user can select a favorite viewing perspective by freely controlling the viewing perspective of the information region.

According to another embodiment, the type or number, or both, of information items displayed in the information region, together with the viewing perspective of the information region, can be controlled. A user can selectively control the type or the number or both of the information items together with the viewing perspective of the information region.

According to another embodiment, the viewing perspective of the information region and the type or number, or both, can be controlled through the touch screen provided in the mobile terminal. Accordingly, the viewing perspective of the information region and the type or number, or both, of the information items can be controlled separately or together using the device characteristic of the touch screen even without entering an additional menu.

A mobile terminal according to some embodiments of the present invention is described below in detail with reference to the accompanying drawings. It is to be noted that the suffixes of constituent elements used in the following description, such as "module" and "unit," are assigned or mixed in use by taking only the easiness of writing this disclosure into consideration, but are not particularly given importance and roles.

While the present invention has been particularly shown and described with reference to exemplary embodiments thereof, it will be understood by those of ordinary skill in the art that various changes in form and details may be made therein without departing from the spirit and scope of the present invention as defined by the following claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a first touch screen; and
   a controller configured to provide the first touch screen with an information region including at least one information item and first and second control regions for controlling a display of the information region, control a viewing perspective of the information region in response to a first touch input for the first control region, and control at least one of a number or type of the at least one information item in response to a second touch input for the second control region, wherein the controller controls the information region so that the at least one information item included in the information region changes between a two-dimensional (2D) and a three-dimensional (3D) in response to the first touch input wherein the first control region includes
   a first slider movable by the first touch input and a first bar which is a moving path of the first slider and the second control region includes a second slider, having a plurality of icons representing different type of information item, movable by the second touch input and a second bar which is moving path of the second slider; and
   a second touch screen,
   wherein the controller expands the first bar to the second touch screen in response to activation of the second touch screen is detected.

2. The mobile terminal of claim 1, wherein, in a case where the at least one information item is controlled to be displayed as a 2D image, the controller displays the at least one information item in either a thumbnail mode or a list mode in response to the first touch input.

3. The mobile terminal of claim 1, wherein:
   when a position of the first slider on the first bar moves to a first position, the controller controls the at least one information item in the information region to be displayed as the 2D image, viewing and
   when a position of the first slider on the first bar moves to a second position, the controller controls the at least one information item in the information region to be displayed as the 3D image.

4. The mobile terminal of claim 1, wherein, when a position of the first slider changes, a viewing perspective of the information region changes between a 2D viewing perspective and a 3D viewing perspectives having different virtual focuses.

5. The mobile terminal of claim 1, wherein, when a position of the first slider changes, the controller changes a viewing perspective of the information region continuously or discontinuously between a 2D viewing perspective and a 3D viewing perspective.

6. The mobile terminal of claim 1, further comprising:
   a second touch screen, wherein the controller displays information corresponding to the at least one information item, included in the information region, on the second touch screen when the second touch screen is activated.

7. The mobile terminal of claim 1, further comprising:
   a second touch screen, wherein the controller provides the second touch screen with a portion of the first control region when the second touch screen is activated.

8. The mobile terminal of claim 1, wherein the second control region includes a second slider movable by the second touch input and a second bar which is a moving path of the second slider.

9. The mobile terminal of claim 8, wherein the controller changes the at least one information item when a position of the second slider on the second bar changes.

10. The mobile terminal of claim 9, wherein the controller changes the at least one information item in a scroll manner or a screen update manner when the position of the second slider changes.

11. The mobile terminal of claim 9, wherein the controller discontinuously changes one or more information items including the at least one information item when the position of the second slider changes.

12. The mobile terminal of claim 1, wherein at least one of the first or second control regions includes an icon for receiving the first touch input or the second touch input, or both.

13. The mobile terminal of claim 1, wherein the at least one information item is selected from the group consisting of an icon, a menu, or content including at least one of text, a still picture, or a motion picture.

14. A method of displaying information in a mobile terminal, comprising:

providing a first touch screen of the mobile terminal with an information region that includes at least one information item and first and second control regions for controlling a display of the information region;

controlling a viewing perspective of the information region in response to a first touch input for the first control region; and controlling at least one of a number or a type of the at least one information item in response to a second touch input for the second control region, wherein controlling the viewing perspective includes controlling the information region so that the at least one information item included in the information region changes between a two-dimensional (2D) image viewing perspective and a three-dimensional (3D) image in response to the first touch input wherein the first control region includes a first slider movable by the first touch input and a first bar which is a moving path of the first slider and the second control region includes a second slider, having a plurality of icons representing different type of information item, movable by the second touch input and a second bar which is moving path of the second slider; and a second touch screen, wherein the controller expands the first bar to the second touch screen in response to activation of the second touch screen is detected.

15. The method of claim 14, wherein, when the at least one information item in the information region is controlled to be displayed as have a 2D image, the at least one information item is displayed in a thumbnail mode or a list mode in response to the first touch input.

16. The method of claim 15, further comprising:
controlling the information region to change between a 2D viewing perspective and a 3D viewing perspective in response to the first touch input, wherein the 2D viewing perspective and the 3D viewing perspective have different virtual focuses.

17. The method of claim 14, wherein controlling at least one of the number or type of the at least one information item includes changing the at least one information item in response to the second touch input.

18. The method of claim 17, wherein controlling at least one of the number or type of the at least one information item includes changing the at least one information item in a scroll manner or a screen update manner.

19. The method of claim 14, wherein the at least one information item includes at least one of an icon, a menu, or content including at least one of text, a still picture, or a motion picture.

* * * * *